UNITED STATES PATENT OFFICE 2,331,280

TREATMENT OF MUD-LADEN DRILLING FLUIDS

Truman B. Wayne, Houston, Tex.

No Drawing. Application March 31, 1939,
Serial No. 265,147

8 Claims. (Cl. 252—8.5)

This invention relates generally to the treatment of mud-laden drilling fluids, and particularly to the treatment of such fluids as are employed in the rotary drilling of oil and gas wells so as to improve the physical properties of said fluids.

The fluid employed for rotary drilling operations contains a gel-forming component and may be made from the natural clay which occurs at the location or may be synthetically compounded from the clay and mud bases of commerce, including bentonite and beidellite. Such fluids may also contain a heavy substance such as barytes, iron oxide, or the like, for increasing the specific gravity of the fluid.

Such fluids as are synthetically compounded may be controlled as to viscosity by a proper variation of the colloidal content, but when the cuttings from the bore hole become entrained in the fluid, its composition has changed, and further control is often necessary in order to maintain the desired viscosity but at the same time to permit the cuttings to settle out and render the fluid of such character that it will not be susceptible to gas cutting. With fluids which are compounded with the clay at the location, it is obvious that such control is more difficult.

It is an object of the present invention, generally stated, to provide a process and agent for the treatment of mud-laden drilling fluids in order to control the viscosity and thixotropic properties thereof.

Another object of the invention is to provide a process and agent for treating such fluids whereby the properties of the hydrated clay colloids are modified and the viscosity of the fluid reduced.

A further object of the invention is to provide a mud-laden drilling fluid and the process of making it in which the properties of the colloidal matter in the fluid are substantially modified and rendered suitable for rotary drilling purposes.

A more specific object of this invention is to provide a process and agent for the treatment of mud-laden drilling fluids from a class of chemical reagents, and a treatment wherein a member of said class of chemical reagents is used, and a drilling fluid which has been suitably modified by said treatment, as will hereinafter be described.

Other objects will become apparent to those skilled in the art when the following description is read.

In accordance with the present invention, generally stated, a mud-laden fluid such as that employed in the rotary drilling of oil wells may be treated with a chemical agent which, upon reaction with certain constituents of the fluid, modifies the colloidal properties of the colloidal matter in the fluid. More specifically, in accordance with the present invention, the degelling action of the mud-laden or drilling fluid is produced by a class of chemical substances which may be generally described as "nitrogenous hydrophilic esters of a water soluble polybasic acid," and which are further characterized by one or more ester radicals containing a residue from a polyhydroxy body.

I have discovered that new chemical substances, valuable for the purposes above described, can be obtained by reacting a strong, water-soluble, polybasic acid compound, including chlorides and anhydrides of these acids, with a hydrophile polyhydroxy body of the type hereinafter described, and a strongly basic amine selected from the group comprising straight chain alkyl amines, cycloalkyl amines, alkylated or arylated cycloalkyl amines, or alkylated or cycloakylated aromatic amines, which contain at least two carbon atoms in each aliphatic radical that is attached directly to the nitrogen atom, where said alkyl radical does not occur between the amino group and an aromatic ring as in the case of benzylamine. Aralkyl amines such as benzylamine are also suitable.

Suitable water-soluble, polybasic acids are the various polybasic phosphoric acids, and their chlorides and anhydrides; concentrated sulfuric acid and chlorosulfonic acid. Certain alkyl sulfonic acids such as ethionic acid are also suitable.

Among the general class of suitable hydrophile polyhydroxy substances are tannin bodies, polyhydroxy phenolic substances, sugars, sugar alcohols, glycols, glycerol, polyglycols, polyglycerols, and polyhydroxy-carboxylic acids, and other similar hydrophile substances possessing acidic functions and/or reactive hydroxyl groups. The polyhydroxy phenols, for instance, are acidic substances and can react without substitution in their hydroxyl groups, or may function as reactive hydroxy bodies with more strongly acidic substances. Commercial tannin extracts such as chestnut extract, quebracho extract, hemlock extract, cutch, etc., or purer chemical substances such as pyrogallol, gallic acid, digallic acid, catechol, phloroglucinol, protocatechuic acid; and other substances such as mucic acid, tartaric acid, glyceric acid, gluconic acid, citric acid, and other acids produced from sugars or polyglycerols; as well as the sugars and their corresponding alcohols, are examples of suitable hydrophile polyhydroxy substances.

Suitable amines may be selected from the group comprising non-hydroxy alkyl amines such as ethyl amine, propylamine, butylamine, amylamine, and octylamine; cycloalkyl amines such as cyclohexylamine and methylcyclohexylamine; aralkyl amines such as benzylamine, benzyl amyl amine, etc.; hydroxyamines such as mono-, di-, and tri-ethanol or propanol amines, and hydroxyalkyl-alkylamines such as N - mono-n-butyl-N- hydroxy - ethylamine, 1 - mono - amylamino-2-hydroxy-3-propanol, etc., are also suitable, and in many cases are preferred for the reason that they possess reactive hydroxyl groups capable of esterification by the polybasic inorganic acid.

While in every case my new products are prepared by reacting (a) a strongly acid water-soluble polybasic acid, (b) a hydrophile polyhydroxy substance, and (c) a strongly basic amine, to form complex nitrogenous polybasic acid esters, it is obvious that my invention embodies several variations of this type of compound because of differences in structure occasioned by different relative positions of the various groups and linkages within the molecule. To illustrate this point, several examples are hereinafter given, each intended to illustrate one embodiment of the invention. It should be understood, however, that I do not wish to limit myself to the specific compounds, proportions of reactive bodies, etc., and methods of preparation herein disclosed, and that they are given merely as examples for the purpose of clearly elucidating the preparation and probable structure of these various embodiments.

In the examples given the application of the reagent is illustrated in connection with a drilling fluid composed of Wyoming bentonite and water in which the bentonite is about 7% by weight of the fluid. Such a drilling fluid is useful in drilling and as prepared has a viscosity of 36 centipoises by a Stormer viscosimeter at 600 R. P. M.

*Example 1*

One type of product embodying the structural characteristics and general properties of my new class of chemical compounds is produced by causing a non-hydroxy alkyl or cycloalkyl amine to react with concentrated sulfuric acid, and then esterifying a polyhydroxy body with one or more molecular equivalents of the acid amine salt so produced. As a specific example, 100 parts of cyclohexylamine are slowly introduced into 105 parts of 66° Bé. sulfuric acid during a period of two hours while maintaining the temperature below 35° C. To the amine acid sulfate are added 170 parts of a technical grade of pyrogallol, and the mass is stirred and heated at from 100° to 200° C. for from two to four hours to form the ester. The product so produced is carefully neutralized with ammonium hydroxide, or with any other base, to methyl orange alkalinity. It is a yellowish to brownish powder when entirely dry, and fully soluble in water.

Products corresponding to the above can be made from other alkyl, cycloalkyl, or aralkyl amines, when reacted with a strong polybasic acid, and a polyhydroxy substance.

A well drilling fluid having an initial viscosity of 36 centipoises was treated with the above nitrogenous ester in the proportion of 1 part of ester to 1000 parts of drilling fluid by weight. The viscosity was lowered to 20 centipoises. Another portion of the same drilling fluid was treated at a ratio of 1 part of ester to 500 parts of drilling fluid. The final viscosity was 15 centipoises.

*Example 2*

Instead of a non-hydroxy alkylamine, a hydroxy alkyl, cycloalkyl, or aralkyl amine may be used. As a specific example, 105 parts of diethanolamine is added to 210 parts of 66° Bé. sulfuric acid over a period of two hours while cooling below 35° C. To the product which is both a salt and ester of the polybasic acid because of esterification of the hydroxyl groups of the amine, is added 190 parts of technical gallic acid and the mass is heated at 100–200° C. to form the complex ester which is probably characterized by the presence of a polybasic acid residue linked to an amine and a polyhydroxy carboxylic body, respectively.

A well drilling fluid having an initial viscosity of 36 centipoises was treated with the nitrogenous ester prepared according to Example 2. When used in the ratio of one part of ester to 1000 parts of drilling fluid, the viscosity was lowered to 18 centipoises. Doubling the proportion to 1 part of ester to 500 parts of drilling fluid lowered the viscosity to 14 centipoises.

The preceding examples exemplify the use of my improved degelling agents on a normal mud-laden drilling fluid prepared in the usual manner from natural or synthetic mud-making materials. The relatively small proportions disclosed are normally sufficient to obtain a satisfactory treatment. However, if it is desired to add larger quantities of gel-forming materials such as bentonite, it is also necessary to use larger proportions of the treating agent, usually from 0.5 to 2.5 per cent, or even higher, based on the weight of the drilling fluid. The excess of treating agent reduces the gel-forming properties of the excess bentonite or other material added, and thus allows larger proportions of gel-forming material to water than normally can be incorporated in the drilling fluid. For instance, wherein a normal 8 per cent suspension of bentonite in water may have a viscosity of 48 centipoises in the Stormer viscosimeter at 600 R. P. M., if the drilling fluid contains as much as 2 per cent of the treating agent, very much larger quantities of bentonite may be incorporated without unduly increasing the viscosity. In fact, fluid muds may thus be prepared from bentonite which approximate the solids composition of muds prepared from natural sources.

It is likewise obvious that muds which have become contaminated with cement, calcareous shales, and/or other sources of polyvalent metal compounds which have produced abnormal viscosities, will require heavier treatments with my improved treating agent to produce normal viscosities for muds so contaminated.

It should be understood that polymerization and inner-condensation may, and probably do, occur in the preparation of the above products. Wherever hydroxy, phenolic, carboxylic, and other similar groups are present, these polymerizations, transformations, and rearrangements of the molecule may be expected. Such modifications, therefore, of the products hereinabove, as well as in the preparation of products from chemical and/or functional equivalents of the above reactive substances, are contemplated in the present invention. Naturally, also, many isomeric forms of these products are possible, as would be expected from a casual inspection of their structural characteristics.

The viscosity-reducing agent embodying this invention is substantially an amino phosphate, as distinguished from casein which has a very small percentage of phosphorus, for example 0.86% (Whitmore's Organic Chemistry, 1937, page 613), and which is a viscosity-augmenting agent.

By the term "amino residue" in the following claims is meant derivatives of amines produced either by salt formation or substitution of its hydrogen atoms by alkyl, cycloalkyl, aralkyl, polyhydric alcohol residues or acyl residues.

These esters may be used in any proportion ranging from 1 part of ester to 10,000 parts of drilling fluid up to 1 part of ester per 100 parts of drilling fluid, depending on the initial viscosity and other characteristics of the drilling fluid, as well as the characteristics desired in the treated drilling fluid.

While in the foregoing, theories are advanced, these are put forward to facilitate the understanding of the objects and purposes of this invention; it is to be understood, however, that this invention is not dependent upon or limited to any theory put forward.

I claim:

1. An aqueous mud-laden drilling fluid for wells containing a small percentage of a viscosity-reducing hydrophilic ester of a water-soluble polybasic acid, characterized by at least one ester radical containing a residue from a polyhydroxy organic body and further characterized by at least one residue from a strongly basic amine, which amine is independent of said polyhydroxy organic body.

2. The process of controlling the viscosity of aqueous mud-laden well drilling fluids comprising adding thereto a small percentage of a viscosity-reducing hydrophilic ester of a water-soluble polybasic acid, characterized by at least one ester radical containing a residue from a polyhydroxy organic body and further characterized by at least one residue from a strongly basic amine, which amine is independent of said polyhydroxy organic body.

3. An aqueous mud-laden drilling fluid for wells containing a small percentage of a viscosity-reducing agent comprising an ester which is the reaction product of a water-soluble polybasic acid, a hydrophile polyhydroxy substance, and a strongly basic amine.

4. The process of controlling the viscosity of aqueous mud-laden drilling fluids comprising adding thereto a small percentage of a viscosity-reducing agent comprising an ester which is the reaction product of a water-soluble polybasic acid, a hydrophile polyhydroxy substance, and a strongly basic amine.

5. An aqueous mud-laden drilling-fluid for wells containing a small percentage of a viscosity-reducing compound having a substantial portion of a water-soluble polybasic acid residue, which compound is a hydrophilic ester of a water-soluble polybasic acid, characterized by at least one ester radical containing a residue from a polyhydroxy organic body further characterized by at least one residue from a strongly basic amine, which amine is independent of said polyhydroxy organic body and further characterized by the fact that it is capable of reducing viscosity resulting from the state of gelation of said fluid during the drilling operation.

6. An aqueous mud-laden drilling fluid for wells containing a small percentage of a viscosity-reducing compound having a substantial portion of a water-soluble polybasic acid residue, which compound is an ester which is the reaction product of a water-soluble polybasic acid, a hydrophile polyhydroxy substance, and a strongly basic amine, and is characterized by the fact that it is capable of reducing viscosity resulting from the state of gelation of said fluid during the drilling operation.

7. The process of controlling the viscosity of aqueous mud-laden drilling-fluids, comprising adding thereto a small percentage of a viscosity-reducing compound having a substantial portion of a water-soluble polybasic acid residue, which compound is an ester which is the reaction product of a water-soluble polybasic acid, a hydrophile polyhydroxy substance and a strongly basic amine, and is characterized by the fact that it is capable of reducing viscosity resulting from the state of gelation of said fluid during the drilling operation.

8. An aqueous mud-laden drilling-fluid for wells with the viscosity resulting from the state of gelation of said fluid during the drilling operation reduced by incorporating therein a small percentage of a compound containing a substantial portion of a water-soluble polybasic acid residue, which compound is an ester which is the reaction product of a water-soluble polybasic acid, a hydrophile polyhydroxy substance and a strongly basic amine, and is characterized by the fact that it is dispersible in a mud-laden fluid.

TRUMAN B. WAYNE.